(12) United States Patent
Lin et al.

(10) Patent No.: US 10,705,376 B2
(45) Date of Patent: Jul. 7, 2020

(54) LIQUID CRYSTAL DISPLAY DEVICE

(71) Applicant: ADVANCED OPTOELECTRONIC TECHNOLOGY, INC., Hsinchu Hsien (TW)

(72) Inventors: Hsin-Chiang Lin, Hsinchu (TW); Chien-Cheng Kuo, Hukou (TW); Pin-Chuan Chen, Hsinchu (TW); Lung-Hsin Chen, Hsinchu (TW); Wen-Liang Tseng, Hsinchu (TW)

(73) Assignee: ADVANCED OPTOELECTRONIC TECHNOLOGY, INC., Hsinchu Hsien (TW)

( * ) Notice: Subject to any disclaimer, the term of this patent is extended or adjusted under 35 U.S.C. 154(b) by 21 days.

(21) Appl. No.: 15/800,165

(22) Filed: Nov. 1, 2017

(65) Prior Publication Data

US 2019/0033659 A1 Jan. 31, 2019

(30) Foreign Application Priority Data

Jul. 27, 2017 (TW) .............................. 106125192 A

(51) Int. Cl.
*G02F 1/1335* (2006.01)
*G02F 1/13357* (2006.01)

(52) U.S. Cl.
CPC .. *G02F 1/133603* (2013.01); *G02F 1/133512* (2013.01); *G02F 1/133514* (2013.01);
(Continued)

(58) Field of Classification Search
CPC ......... G02F 1/133603; G02F 1/133514; G02F 1/133617; G02F 2001/133607; G02F 2001/133612; G02F 2001/133614; G02F 2001/01791; G02B 5/22; G02B 5/223; G02B 5/283; G02B 5/23; H01L 33/04; H01L 33/08; H01L 33/40; H01L 27/15;
(Continued)

(56) References Cited

U.S. PATENT DOCUMENTS

2007/0146584 A1* 6/2007 Wang ...................... G02B 5/201
349/106
2015/0042933 A1* 2/2015 Ueki .................... G02B 5/0242
349/108
(Continued)

FOREIGN PATENT DOCUMENTS

JP 2014-38354 2/2014
TW 200724986 7/2007
(Continued)

*Primary Examiner* — Angela K Davison
(74) *Attorney, Agent, or Firm* — ScienBiziP, P.C.

(57) ABSTRACT

A liquid crystal display device comprises a backlight module and a liquid crystal display module in a light emitting path of the backlight module. The liquid crystal display module includes a first conductive substrate facing the backlight module, a second conductive substrate spaced apart from the first conductive substrate, and a liquid crystal layer sandwiched between the first conductive substrate and the second conductive substrate. The second conductive substrate includes a transparent substrate, a color filter layer formed on the transparent substrate, and a light converting layer formed on the color filter layer, and a transparent conductive layer formed on the light converting layer.

15 Claims, 7 Drawing Sheets

(52) U.S. Cl.
CPC .. *G02F 1/133605* (2013.01); *G02F 1/133606* (2013.01); *G02F 1/133617* (2013.01); *G02F 2001/133607* (2013.01); *G02F 2001/133612* (2013.01); *G02F 2001/133614* (2013.01); *G02F 2201/52* (2013.01); *G02F 2202/36* (2013.01)

(58) Field of Classification Search
CPC .............. H01L 27/153; H01L 51/5012; H01L 51/5015; H01L 51/502; F21K 9/66; F21V 5/004
See application file for complete search history.

(56) References Cited

U.S. PATENT DOCUMENTS

| | | | |
|---|---|---|---|
| 2016/0070136 A1* | 3/2016 | Jang ................. | G02F 1/133514 349/61 |
| 2017/0018685 A1* | 1/2017 | Cho ..................... | H01L 33/007 |
| 2017/0068362 A1* | 3/2017 | Den Boer ............ | G06F 3/0412 |
| 2018/0006093 A1* | 1/2018 | Kim .................... | G02B 5/3041 |

FOREIGN PATENT DOCUMENTS

| | | |
|---|---|---|
| TW | 201005367 | 2/2010 |
| TW | 201619541 | 6/2016 |

\* cited by examiner

ID DISPLAY DEVICE

LIQUID CRYSTAL DISPLAY DEVICE

FIELD

The subject matter herein generally relates to liquid crystal display device and, specifically, to a liquid crystal display device including a light converting layer and a color filter layer.

BACKGROUND

Flat panel display (FPD) devices have advantages in terms of thinness, light weight, and low power consumption FPD devices include liquid crystal display (LCD) devices, plasma display panel (PDP) devices, electroluminescence display (ELD) devices, field emission display (FED) devices, and these have mostly replaced cathode ray tubes (CRTs).

Among these devices, liquid crystal display devices have attracted attention as a next generation advanced display device which is characterized by low power consumption, good portability, highly integrated technology, and high added value. Liquid crystal display (LCD) devices usually includes a backlight module and a liquid crystal display module, and the backlight module is configured to provide light source for the liquid crystal display module. Color rendition and panel transmittance are determined by the liquid crystal display module.

BRIEF DESCRIPTION OF THE DRAWINGS

Implementations of the present technology will now be described, by way of example only, with reference to the attached figures.

DETAILED DESCRIPTION

Figure 1:
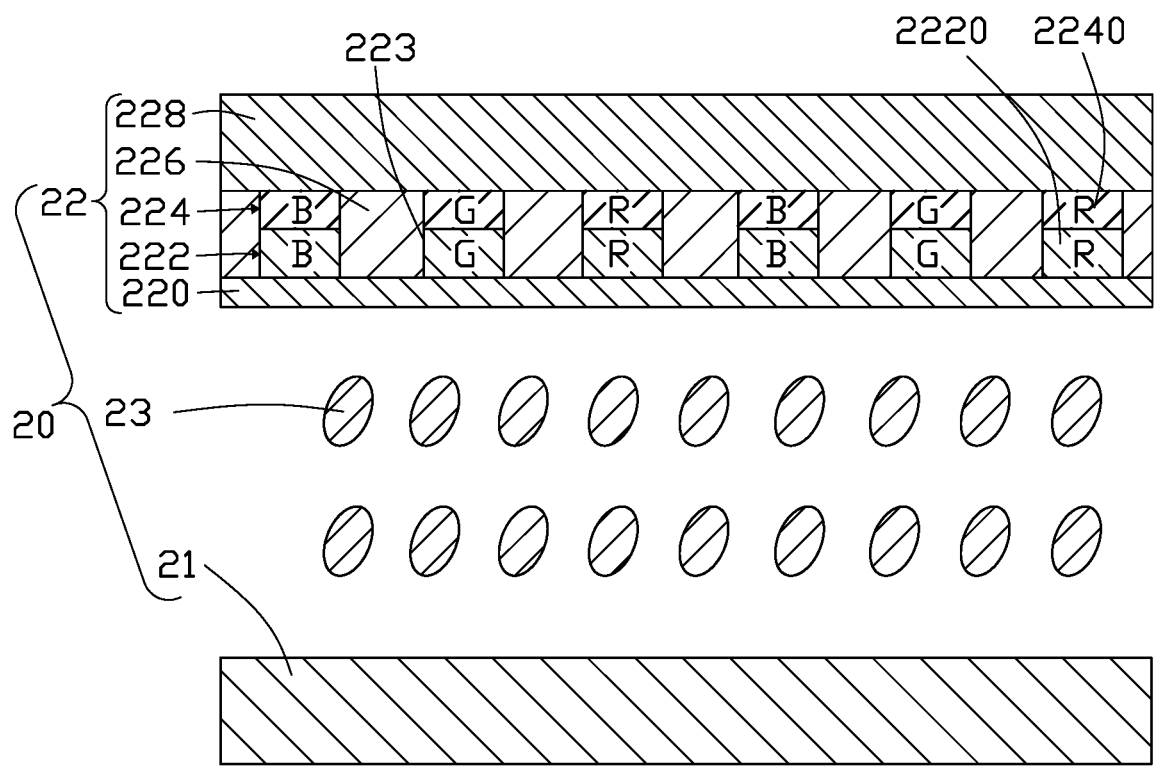
FIG. 1 is cross-sectional view of a liquid crystal display device in accordance with one exemplary embodiment.
Figure 1:
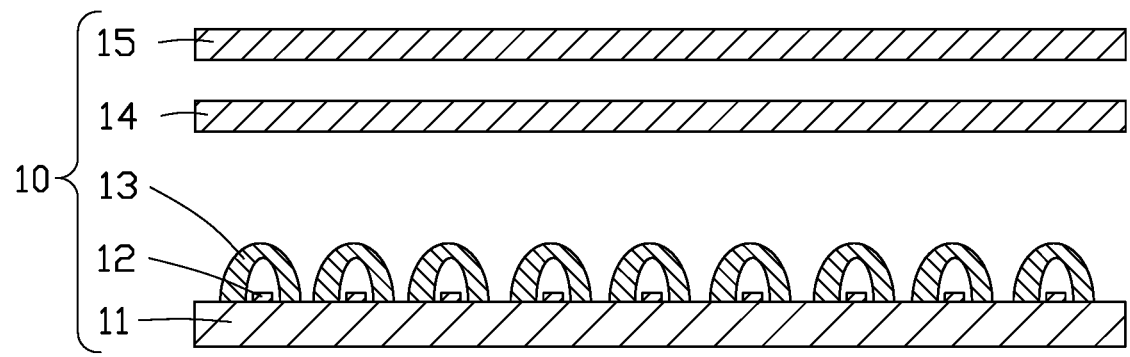

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to illustrate details and features of the present disclosure better. The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like. The references "a plurality of" and "a number of" mean "at least two."

EXAMPLE 1

FIG. 1 illustrates a liquid crystal display device 100 according to one embodiment. The liquid crystal display device 100 includes a backlight module 10 and a liquid crystal display module 20 disposed in a light emitting path of the backlight module 10. In the illustrated embodiment, the backlight module 10 is a direct type backlight module. In an alternative embodiment, the backlight module 10 is also can be a laterally-entering type backlight module.

The backlight module 10 includes a printed circuit board 11, a plurality of light-emitting diodes 12 mounted on the printed circuit board 11, a secondary optical lenses 13 covering each LED 12 and fixed on the printed circuit board 11, a diffusing film 14 arranged in a light emitting path of the LEDs 12, and an optical film 15 arranged in a light emitting path of the diffusing film 14.

The light-emitting diodes 12 may be red, green, or blue LEDs or any combination thereof.

The secondary optical lens 13 is made from transparent material with good optical properties, such as PMMA or PC plastic. An inner surface of the secondary optical lens 13 is an ellipsoid, and an outer surface of the secondary optical lens 13 is a semicircular surface. The top point of the inner surface of the secondary optical lens 13 is used for diverging the light which radiates from the LED 12. When light from the LEDs 12 strikes the inner surface, part of the light at a center portion travels through a top point of the ellipsoid. All other light is refracted to sides of the secondary optical lens 13.

The diffusion film 14 is used to randomly change the light emitting path of light from the secondary optical lens 13 and further homogenize light emitted from the secondary optical lens 13. The uniform brightness of incident light is thus improved.

The optical film 15 is a light enhancement film or a prismatic lens film.

The liquid crystal display module 20 includes a first conductive substrate 21 facing the backlight module 10, a second conductive substrate 22 spaced apart from the first conductive substrate 21, and a liquid crystal layer 23 sandwiched between the first conductive substrate 21 and the second conductive substrate 22.

The first conductive substrate 21 faces toward the backlight module 10. In the illustrated embodiment, the first conductive substrate 21 is a thin film transistor (TFT) array substrate.

The second conductive substrate 22 includes a transparent conductive layer 220, a light converting layer 222, a color filter layer 224, a transparent substrate 228, and a black matrix layer 226. The color filter layer 224 is formed on the transparent substrate 228, and the light converting layer 222 is formed on the color filter layer 224. The transparent conductive layer 220 is in contact with the light converting layer 222.

The color filter layer 224 includes filter color blocks 2240. The filter color blocks 2240 are red, green, and blue, and the filter color blocks 2240 are repeatedly displayed on the transparent substrate 228. Blue filter color blocks 2240 allow blue light to pass through and block green light and red light; red filter blocks 2240 allow red light to pass through and block green light and blue light, and green filter blocks allow only green light to pass through and block blue and red light.

The light converting layer 222 includes fluorescent color blocks 2220, and the fluorescent color blocks 2220 are formed on the color filter layer 224. Each fluorescent color block 2220 is aligned with each filter color block 2240, and a color of the fluorescent color block 2220 is same as a corresponding filter color block 2240. The light converting layer 222 is configured to convert the wavelengths of incident light. That is, when a monochromatic light of the first wavelength passes through the light converting layer 222 and the monochromatic light of the first wavelength is excited by light converted material of the light converting layer 222, it is converted to monochromatic light of second wavelengths.

The light converting layer 222 and the color filter 224 together form a plurality of gaps on the transparent substrate 228, and the gaps form a black matrix layer 226. The liquid crystal layer 23 is sandwiched between the first conductive substrate 21 and the transparent conductive layer 220, and a voltage is applied to the first conductive substrate 21 and the transparent conductive layer 220 The liquid crystals of the liquid crystal layer 23 change their arrangement in response to the electric field applied to the first conductive substrate 21 and the transparent conductive layer 220, thereby changing a light transmittance.

The light conversion layer 222 comprises red fluorescent color block 2220 formed by red phosphor material, green fluorescent color block 2220 formed by green phosphor material and blue fluorescent color block formed by blue phosphor material.

The red phosphor material can be potassium fluosilicate (KSF, $(K_2(SiF_6):Mn_4)$, SLA $(Sr(LiAl_3N_4):Eu)$ or SiAlON (SiAlON:Eu) and combinations thereof.

The green phosphor material can be nitrides, such as Oxy-Nitrides, Carbido-Nitrides, or $CaAlSiN_3:Eu^{2+}$; or silicides, such as Silicates, Oxy/Ortho-Silicates.

The blue fluorescent material can be ZnS:Ag, ZnS:Zn, ZnS:Ag, (Ba, Eu)$Mg_2Al_{16}O_{27}$, $BaMgAl_{10}O_{17}$:Eu, Mn, $Ca_5F(PO_4)_3$:Sb, (Ca, Sr, Ba)$_{10}(PO_4)_6Cl_2$:Eu and combinations thereof.

The light conversion layer 222 may also be a transparent polymer layer and a plurality of quantum dots are formed in the transparent polymer layer. The quantum dots may each have a diameter of about 1 to 10 nm. The quantum dots 112 may comprise, for example, a particle having a single layer or multi-layered structure which includes at least one semiconductor crystal selected from the group consisting of CdS, CdO, CdSe, CdTe, $Cd_3P_2$, $Cd_3As_2$, ZnS, ZnO, ZnSe, ZnTe, MnS, MnO, MnSe, MnTe, MgO, MgS, MgSe, MgTe, CaO, CaS, CaSe, CaTe, SrO, SrS, SrSe, SrTe, BaO, BaS, BaSe, BaTE, HgO, HgS, HgSe, HgTe, AgI, AgBr, $Al_2O_3$, $Al_2S_3$, $A_{/2}Se_3$, Al2Te3, $Ga_2O_3$, $Ga_2S_3$, $Ga_2Se_3$, $Ga_2Te_3$, $In_2O_3$, $In_2S_3$, $In_2Se_3$, $In_2Te_3$, $SiO_2$, $GeO_2$, $SnO_2$, SnS, SnSe, SnTe, PbO, $PbO_2$, PbS, PbSe, PbTe, AlN, AlP, AlAs, AlSb, GaN, GaP, GaAs, GaSb, $GaInP_2$, InN, InP, InAs, InSb, $TiO_2$, Si, Ge, and combinations thereof.

The material of the transparent substrate 228 can be made of glass, transparent inorganic substrate, or plastic material, such as polyethylene terephthalate (PET).

In this embodiment, the light emitting diodes 12 are UV light-emitting diodes Light is emitted from the light emitting diode 12 to pass through the light converting layer 222, and the light converting layer 222 can convert the light from the light emitting diode 12 into blue light with a wavelength in a range of 430 nm to 470 nm, green light with a wavelength in a range of 520 nm to 560 nm, and red light with a wavelength in a range of 630 nm to 660 nm.

The black matrix layer 226 is configured to absorb stray light between adjacent pixels, and reduce or prevent light interference between different color lights of adjacent pixels. The black matrix layer 226 is formed by gaps between the light converting layer 222 and the color filter layer 224, and a thickness of the black matrix layer 226 equals a total thickness of the optical converting layer 222 and the color filter layer 224.

The color filter layer 224 is used to filter the light passing through the light conversion layer 222, to render the color of the monochromatic light emitted from the color filter layer 224 more pure, thereby, the liquid crystal display device 100 has a good color rendition, a good panel transmittance and a high contrast as a visual effect.

Figure 2:
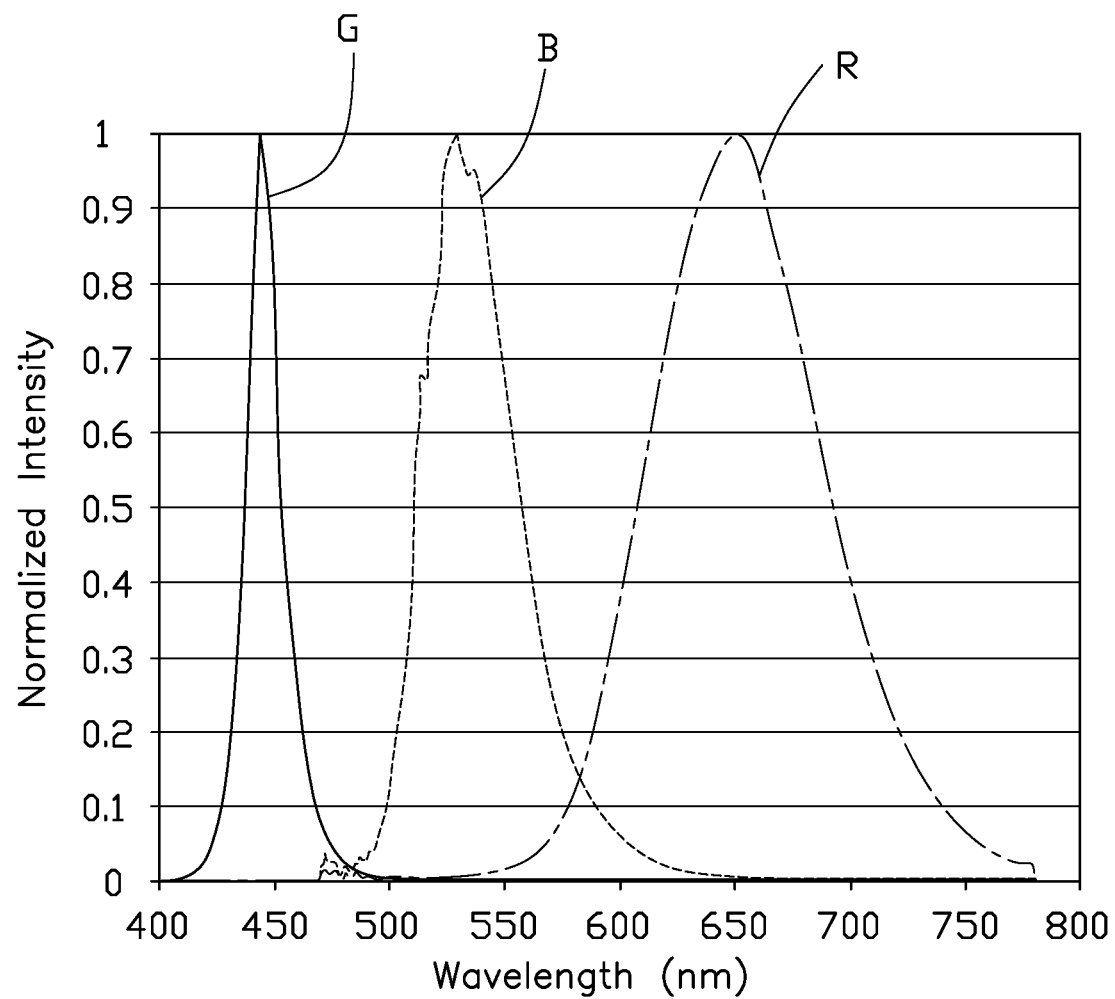
FIG. 2~4 show relationships between a wavelength λ and intensity I when the liquid crystal display device of FIG. 1. is working.
Figure 3:
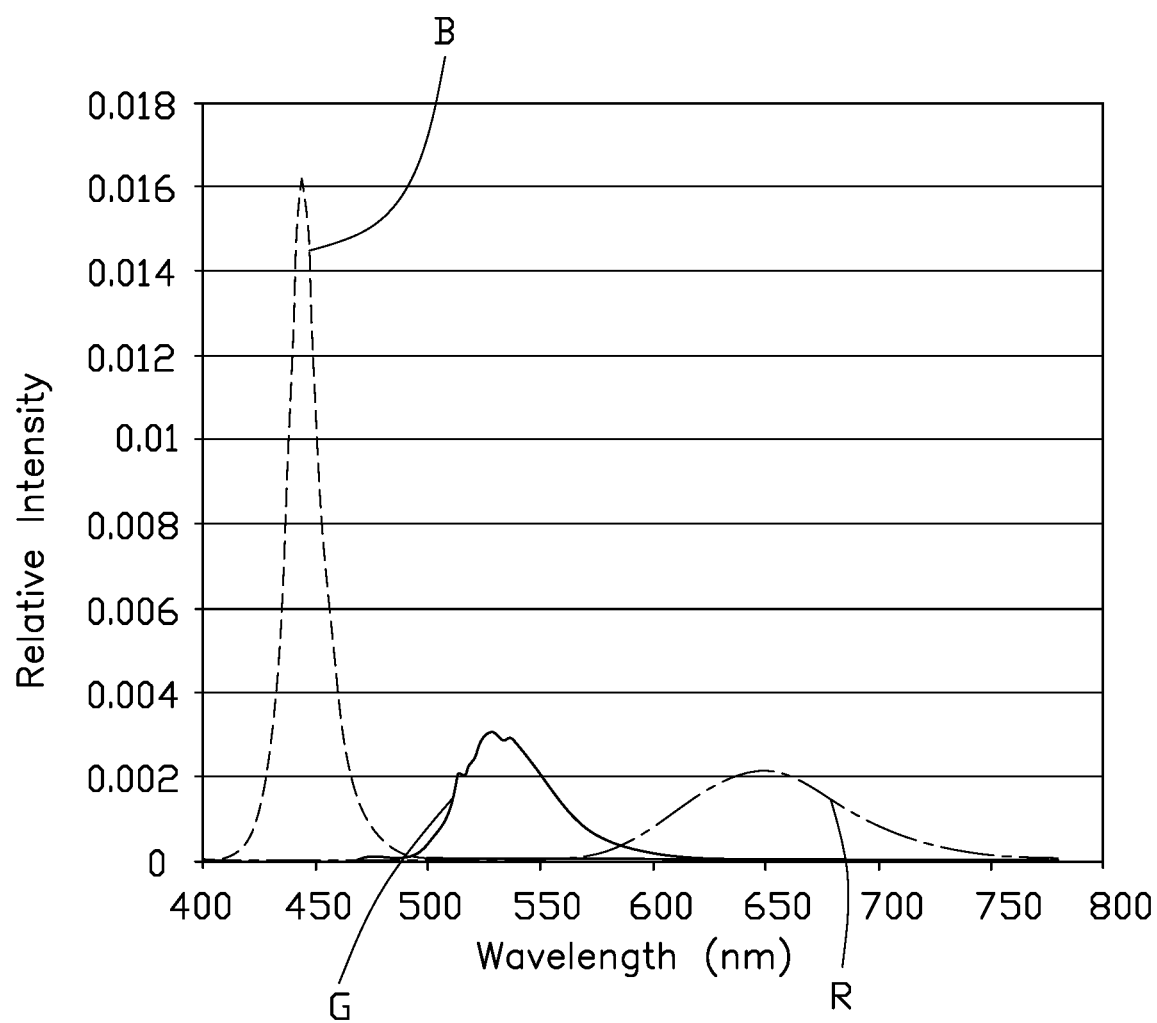
Figure 4:
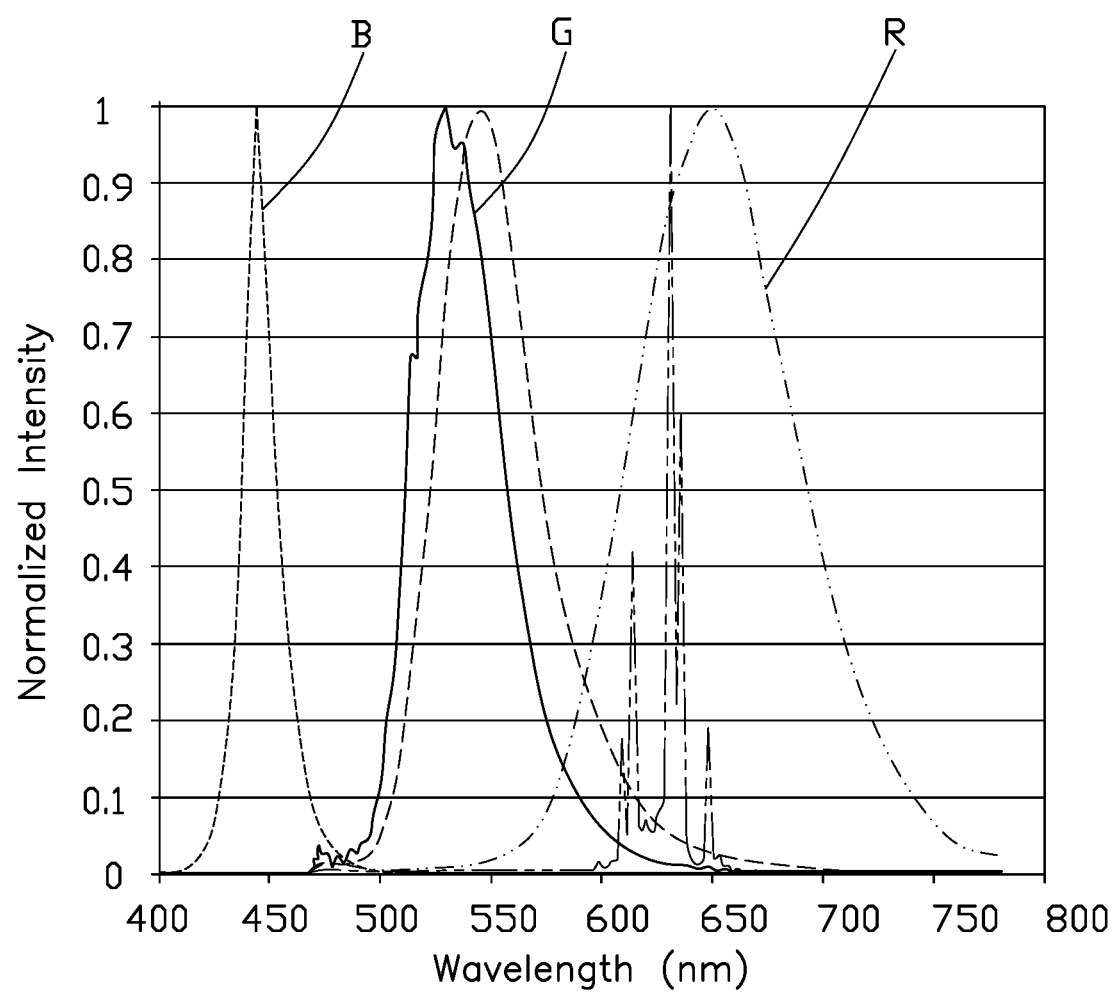

FIG. 2~4 illustrate a relationship between a wavelength $\lambda$ and an intensity I. The wavelength is a wavelength of light emitted from the light emitting diodes 12, the intensity I represents an intensity detected when the light from light emitting diodes passing through the backlight module and the liquid crystal display module 20. When light from the light emitting diodes 12 passes through the color filter layer 224, the wavelength is between 525 and 650 nm, an overlapping area of green light and blue light is in a range of 550 nm and 640 nm. That is, wavelength overlapping area is less than 100 nm, and the liquid crystal display device 100 thereby meets a demand of good color rendition.

As shown in FIG. 3, wavelength in a range from 525 nm to 650 nm, a peak of the spectrum intensity emitted from the green fluorescence blocks is about 529 nm; a peak of the spectrum intensity emitted from the red fluorescence blocks is about 649 nm, and a wavelength corresponding to the intersection point of the wavelength overlap region is about 586 nm. 586−529=57 nm and 649−588=61 nm, that is, wavelength overlapping area of spectrum intensity distribution of green phosphor blocks is in a range from 50 to 100 nm. Wavelength overlapping area of spectrum intensity distribution of red phosphor blocks is also in a range from 50 to 100 nm and a wavelength corresponding to the intersection point of the wavelength overlap region is about 586 nm. The intensity I at the wavelength of 586 nm is therefore 0.00038; and a maximum intensity at a location of blue light is at wavelength of 444 nm. Light intensity, and I(max)=0.01619, and a ratio of light intensity at the intersection point and the maximum intensity is I/Imax=2.35%, and the ratio is in a range of 0%5%. Thereby, the liquid crystal display device 100 can meet a demand of high contrast as a visual effect.

EXAMPLE 2

Figure 5:
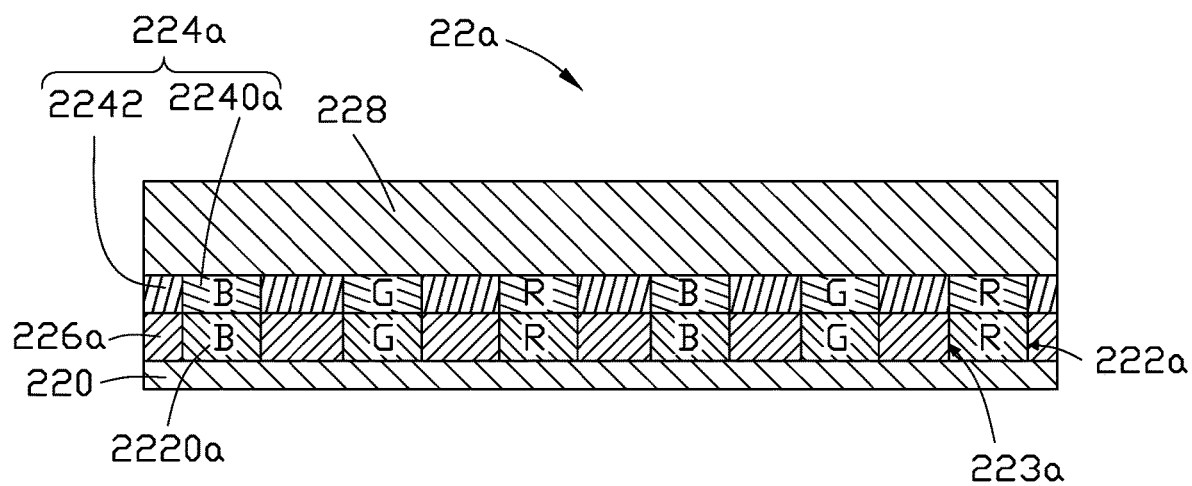
FIG. 5 is a cross-sectional view of a second conductive substrate of the device of FIG. 1 in accordance with one exemplary embodiment.
Figure 6:
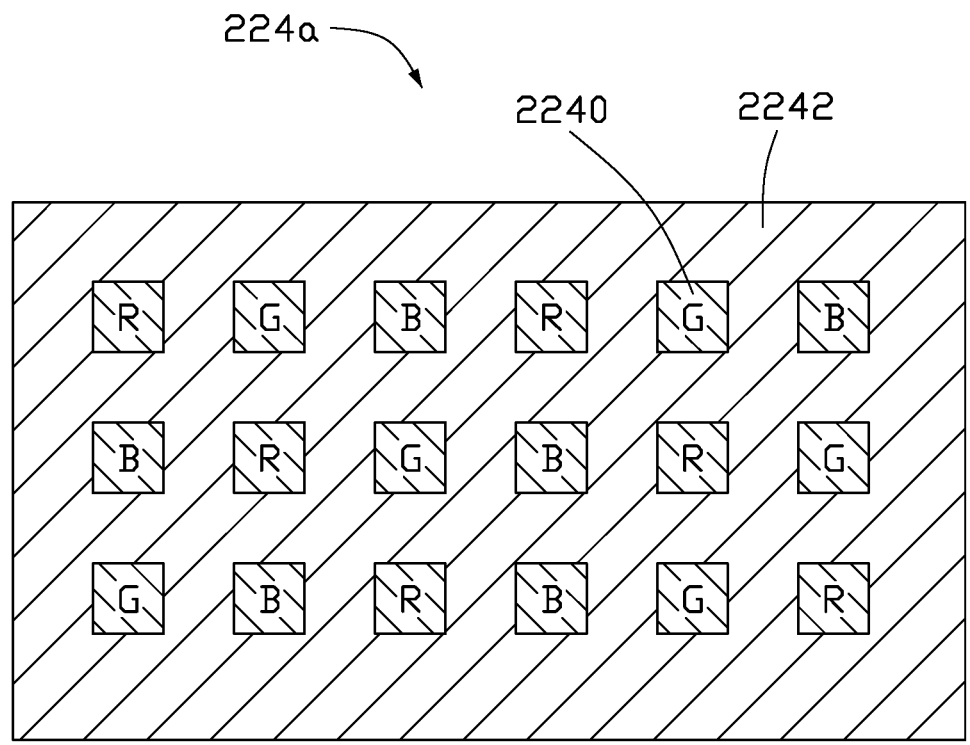
FIG. 6 is a top view of a second conductive substrate of the device of FIG. 5.

FIGS. 5~6 illustrate a second conductive substrate 22a according to another embodiment. The second conductive substrate 22a in FIG. 2 is similar to the second conductive substrate 22 in FIG. 1. The difference between the second conductive substrate 22a and the second conductive substrate 22 is that the second conductive substrate 22a includes a transparent conductive layer 220, a light converting layer 222, a color filter layer 224a, a transparent substrate 228, and a black matrix layer 226a.

The color filter layer 224a includes a substrate layer 2242 and a plurality of fluorescent color blocks 2240a formed in the substrate layer 2242. The light converting layer 222a is formed on the color filter layer 224a, and the light converting layer 222a forms a plurality of gaps. The black matrix layer 226a is formed in the gaps 223a, and a thickness of the black matrix layer 226a equals a thickness of the light converting layer 222a.

EXAMPLE 3

Figure 7:
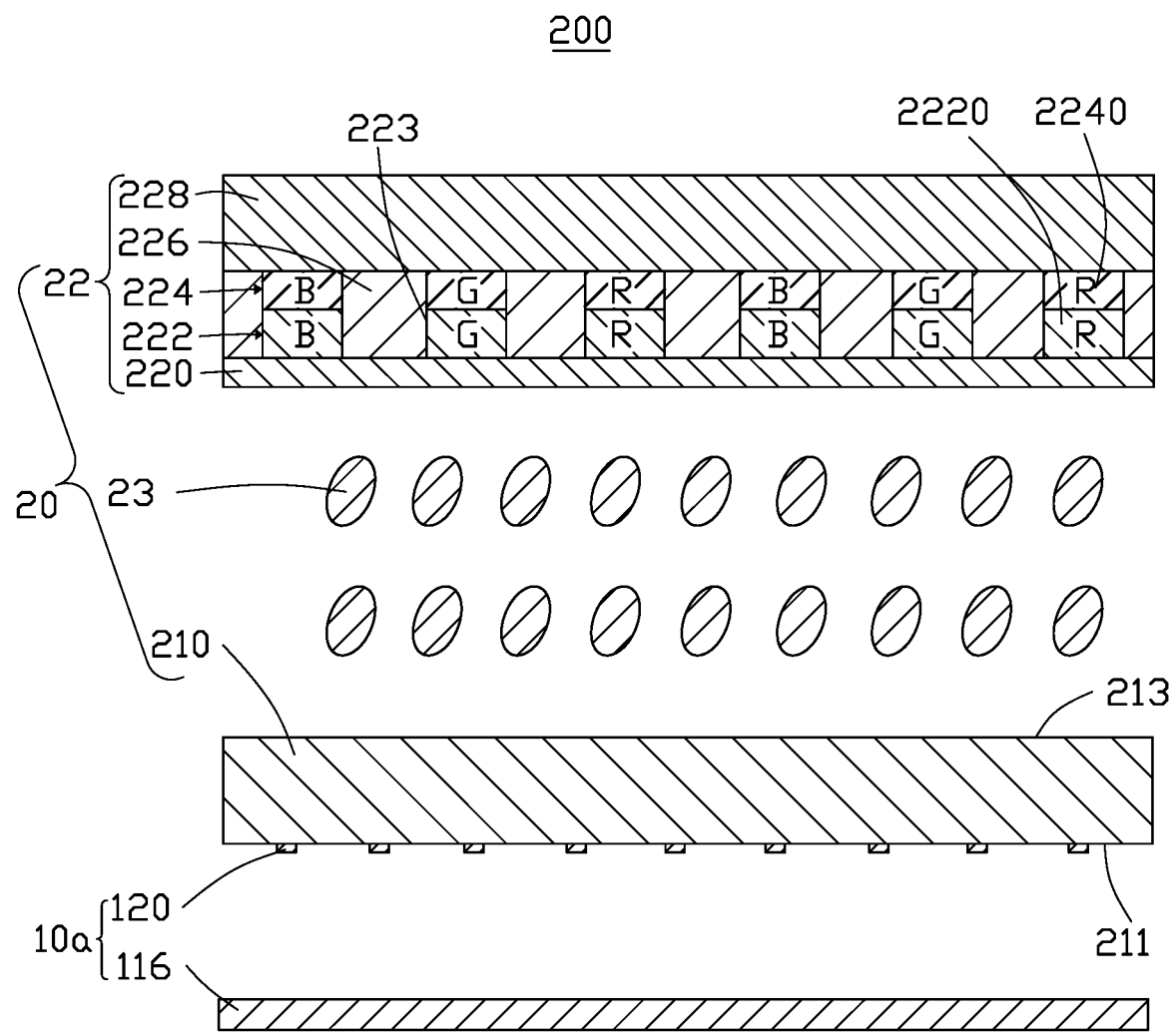
FIG. 7 is a cross-sectional view of a liquid crystal display device in accordance with one exemplary embodiment.

FIG. 7 illustrates a liquid crystal display device 200 according to another embodiment. The liquid crystal display device 200 in FIG. 4 is similar to the liquid crystal display device 100 in FIG. 1. The difference between the liquid crystal display device 200 and the liquid crystal display device 100 in FIG. 1 is that the backlight module 10a only includes a plurality of light-emitting diode chips 120 and a reflecting board 116. The light-emitting diode chips 120 can be selected from flip chips, micro LED chips, or RBG LED chips.

The first conductive substrate 210 includes a first surface 211 and a second surface 213 opposite to the first surface 211. The light-emitting diode chips 120 are mounted on the second surface 211 of the first conductive substrate 210 and are electrically connected with the first conductive substrate 210. The second surface 213 is configured to mount a plurality of thin film transistors. Light emitting paths of the light-emitting diodes 120 move spaced from the liquid crystal layer 23. Light emitted from the light-emitting diodes 120 is first incident on the reflecting board 116, and is then reflected by the reflecting board 116, and is lastly incident on the first surface 211 of the first conductive substrate 210.

The embodiments shown and described above are only examples. Therefore, many commonly-known features and details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. A liquid crystal display device comprising: a backlight module; and a liquid crystal display module disposed in a light emitting path of the backlight module; the liquid crystal display module comprising: a first conductive substrate in a light emitting path of the backlight module, a second conductive substrate being spaced apart from the first conductive substrate and a liquid crystal layer being sandwiched between the first conductive substrate and the second conductive substrate, wherein the liquid crystal display module further comprises a light converting layer on a front side of a transparent conductive layer and a color filter layer on a front side of the light converting layer, and light emitting from the backlight module successively passes through the first conductive substrate, the liquid crystal layer, the transparent conductive layer, the light converting layer and the color filter layer; wherein the color filter layer comprises a plurality of filter color blocks spaced apart from each other; the light converting layer comprises a plurality of fluorescent color blocks spaced apart from each other, the fluorescent color blocks comprise a plurality of first fluorescent color blocks, a plurality of second fluorescent color blocks, and a plurality of third fluorescent color blocks, the filter color blocks comprise a plurality of first filter color blocks, a plurality of second filter color blocks, and a plurality of third filter color blocks, each first fluorescent color block is aligned with one first color block, each second fluorescent color block is aligned with one second color block, and each third fluorescent color block is aligned with one third color block, each first fluorescent color block converts light emitted by the backlight module to a first color of light, each first filter color block allows the first color of light to pass through and blocks all colors of light except for the first color of light, each second fluorescent color block converts light emitted by the backlight module to a second color of light, each second filter color block allows the second color of light to pass through and blocks all colors of light except for the second color of light, each third fluorescent color block converts light emitted by the backlight module to a third color of light, each third filter color block allows the third color of light to pass through and blocks all colors of light except for the third color of light, the first color, the second color, and the third color being three different colors, wherein the backlight module comprises a plurality of light-emitting diode chips and a reflecting board, the first conductive substrate defines a first surface and a second surface opposite to the first surface, the light-emitting diode chips are mounted on the second surface, and the reflecting board faces the second surface.

2. The liquid crystal display device of claim 1, wherein the second conductive substrate further comprises a black matrix layer, the black matrix layer comprises a plurality of gaps on the transparent substrate, the light converting layer and the color filter layer are together formed on the transparent substrate and are filled in the gaps, a thickness of the black matrix layer equals a total thickness of the optical converting layer and the color filter layer.

3. The liquid crystal display device of claim 1, wherein the color filter layer is arranged between the light converting layer and the transparent substrate, the color filter layer comprises a substrate layer and a plurality of fluorescent color blocks formed in the substrate layer.

4. The liquid crystal display device of claim 3, wherein the light converting layer comprises a plurality of fluorescent color blocks spaced apart from each other, and the fluorescent color blocks form a plurality of gaps, the second conductive substrate further comprises a black matrix layer, and the black matrix layer is formed in the gaps, and a thickness of the black matrix layer equals a thickness of the light converting layer.

5. The liquid crystal display device of claim 4, wherein the backlight module comprises a printed circuit board, a plurality of light-emitting diodes (LEDs) mounted on the printed circuit board, a diffusing film arranged in a light emitting path of the LEDs and an optical film arranged in a light emitting path of the diffusing film.

6. The liquid crystal display device of claim 5, wherein the backlight module further comprises a plurality of secondary optical lenses, and each of the secondary optical lenses covers one of the LEDs and is fixed on the printed circuit board; wherein an inner surface of the secondary optical lens is an ellipsoid, and an outer surface of the secondary optical lens is a semicircular surface, such that the inner surface focuses a central portion of light beams from the LEDs to a top point of the ellipsoid, and refracts other light beams from the LEDS to sides of the secondary optical lens.

7. A liquid crystal display device comprising: a backlight module; and a liquid crystal display module disposed in a light emitting path of the backlight module; the liquid crystal display module comprising: a first conductive substrate facing the backlight module, a second conductive substrate being spaced apart from the first conductive substrate, and a liquid crystal layer being sandwiched between the first conductive substrate and the second conductive substrate, wherein the second conductive substrate comprises a transparent substrate, a color filter layer formed on the transparent substrate, and a light converting layer formed on the color filter layer, and a transparent conductive layer formed on the light converting layer, the transparent conductive layer faces toward the liquid crystal layer and the transparent substrate is spaced from the liquid crystal layer; wherein the color filter layer comprises a plurality of filter color blocks spaced apart from each other, the light converting layer comprises a plurality of fluorescent color blocks spaced apart from each other, the fluorescent color blocks comprise a plurality of first fluorescent color blocks, a plurality of second fluorescent color blocks, and a plurality of third fluorescent color blocks, the filter color blocks comprise a plurality of first filter color blocks, a plurality of second filter color blocks, and a plurality of third filter color blocks, each first fluorescent color block is aligned with one first color block, each second fluorescent color block is aligned with one second color block, and each third fluorescent color block is aligned with one third color block, each first fluorescent color block converts light emitted by the backlight module to a first color of light, each first filter color block allows the first color of light to pass through and blocks all colors of light except for the first color of light, each second fluorescent color block converts light emitted by the backlight module to a second color of light, each second filter color block allows the second color of light to pass through and blocks all colors of light except for the second color of light, each third fluorescent color block converts light emitted by the backlight module to a third color of light, each third filter color block allows the third color of light to pass through and blocks all colors of light except for the third color of light, the first color, the second color, and the third color being three different colors, wherein the backlight module comprises a plurality of light-emitting diode chips and a reflecting board, the first conductive substrate defines a first surface and a second surface opposite to the first surface, the light-emitting diode chips are mounted on the second surface, and the reflecting board faces the second surface.

8. The liquid crystal display device of claim 7, wherein the second conductive substrate further comprises a black matrix layer, the light converting layer and the color filter layer together form a plurality of gaps on the transparent substrate, the black matrix layer is formed on the transparent substrate and filled in the gaps, a thickness of the black matrix layer equals a total thickness of the optical converting layer and the color filter layer.

9. The liquid crystal display device of claim 4, wherein the light-emitting diode chips are selected from flip chips, micro LED chips and RBG LED chips.

10. The liquid crystal display device of claim 7, wherein the color filter layer is arranged between the light converting layer and the transparent substrate, the color filter layer comprises a substrate layer and a plurality of fluorescent color blocks formed in the substrate layer.

11. The liquid crystal display device of claim 10, wherein the light converting layer comprises a plurality of fluorescent color blocks spaced apart from each other, and a plurality of gaps are formed between each adjacent the fluorescent color blocks, and the second conductive substrate further comprises a black matrix layer, and the black matrix layer is formed in the gaps, and a thickness of the black matrix layer equals a thickness of the light converting layer.

12. The liquid crystal display device of claim 11, wherein the backlight module comprises a printed circuit board, a plurality of light-emitting diodes (LEDs) mounted on the printed circuit board, a diffusing film arranged in a light emitting path of the LEDs, and an optical film arranged in a light emitting path of the diffusing film.

13. The liquid crystal display device of claim 12, wherein the optical film is a light enhancement film or a prismatic lens film.

14. The liquid crystal display device of claim 12, wherein the backlight module further comprises a plurality of secondary optical lenses, and each of the secondary optical lenses covers one of the LEDs and is fixed on the printed circuit board.

15. The liquid crystal display device of claim 14, wherein an inner surface of the secondary optical lens is an ellipsoid, and an outer surface of the secondary optical lens is a semicircular surface, such that the inner surface focuses a central portion of light beams from the LEDs to a top point of the ellipsoid, and refracts other light beams from the LEDs to sides of the secondary optical lens.

\* \* \* \* \*